(12) United States Patent
Devarajan et al.

(10) Patent No.: US 8,924,788 B2
(45) Date of Patent: Dec. 30, 2014

(54) REPLAYING ARCHITECTURAL EXECUTION WITH A PROBELESS TRACE CAPTURE

(75) Inventors: Ramesh Devarajan, Bangalore (IN); Jaemon D. Franko, Lakewood, WA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 12/825,014

(22) Filed: Jun. 28, 2010

(65) Prior Publication Data

US 2011/0320877 A1 Dec. 29, 2011

(51) Int. Cl.
G06F 11/00 (2006.01)
G06F 11/36 (2006.01)

(52) U.S. Cl.
CPC ........ G06F 11/3636 (2013.01); G06F 11/3664 (2013.01)
USPC ............................ 714/33; 714/38.1; 714/47.1

(58) Field of Classification Search
USPC ............................ 714/33, 38.1, 47, 0.33, 47.1
See application file for complete search history.

(56) References Cited

U.S. PATENT DOCUMENTS

| | | | |
|---|---|---|---|
| 5,513,315 A * | 4/1996 | Tierney et al. ................. | 714/37 |
| 6,145,099 A | 11/2000 | Shindou | |
| 7,380,235 B1 * | 5/2008 | Fathalla ........................ | 717/109 |
| 7,747,844 B2 * | 6/2010 | McCormick et al. ......... | 712/227 |
| 7,904,373 B2 * | 3/2011 | Kimle et al. ................... | 705/37 |
| 8,103,497 B1 * | 1/2012 | Nemecek et al. .............. | 703/28 |
| 8,135,572 B2 * | 3/2012 | Crawford et al. .............. | 703/22 |
| 8,402,318 B2 * | 3/2013 | Nieh et al. ..................... | 714/38.1 |
| 8,578,342 B2 * | 11/2013 | Artzi et al. .................... | 717/131 |
| 2003/0018461 A1 * | 1/2003 | Beer et al. ...................... | 703/14 |
| 2003/0126505 A1 | 7/2003 | Lacey | |
| 2003/0200491 A1 * | 10/2003 | Woo et al. ..................... | 714/718 |
| 2004/0268331 A1 * | 12/2004 | Mitchell et al. ............... | 717/146 |
| 2005/0010880 A1 * | 1/2005 | Schubert et al. ................ | 716/4 |
| 2005/0071499 A1 * | 3/2005 | Batra et al. .................... | 709/236 |
| 2006/0015852 A1 | 1/2006 | Parkinson et al. | |
| 2006/0155525 A1 | 7/2006 | Aguilar et al. | |
| 2006/0156157 A1 * | 7/2006 | Haselden et al. ............. | 714/746 |
| 2007/0011517 A1 * | 1/2007 | Boyce ............................ | 714/724 |
| 2007/0192079 A1 * | 8/2007 | Rompaey et al. .............. | 703/19 |
| 2008/0046696 A1 * | 2/2008 | Vertes ............................ | 712/214 |
| 2008/0177525 A1 * | 7/2008 | Crawford et al. .............. | 703/22 |

(Continued)

FOREIGN PATENT DOCUMENTS

JP 64-052062 A 2/1989
JP 01-251142 A 10/1989

(Continued)

OTHER PUBLICATIONS

International Search Report and Written Opinion received for PCT application No. PCT/US2011/041086, mailed on Jan. 2, 2012, 7 pages.

(Continued)

Primary Examiner — Loan L. T. Truong
(74) Attorney, Agent, or Firm — Jordan IP Law, LLC

(57) ABSTRACT

A system and method provide for capturing architecture data for software executing on a system, wherein the architecture data can include state data and event data. The captured architecture data may be replayed in a simulator, wherein failure information corresponding to the software is obtained from the simulator.

18 Claims, 2 Drawing Sheets

(56) References Cited

U.S. PATENT DOCUMENTS

| | | | |
|---|---|---|---|
| 2008/0189246 A1* | 8/2008 | Lloyd | 707/3 |
| 2008/0243463 A1* | 10/2008 | Lovas et al. | 703/17 |
| 2008/0243572 A1* | 10/2008 | Amos | 705/7 |
| 2008/0270958 A1* | 10/2008 | Ng et al. | 716/5 |
| 2008/0281575 A1* | 11/2008 | Okamura et al. | 703/21 |
| 2009/0089320 A1* | 4/2009 | Tendler et al. | 707/102 |
| 2009/0119549 A1* | 5/2009 | Vertes | 714/47 |
| 2009/0133033 A1* | 5/2009 | Lindo et al. | 718/108 |
| 2009/0210752 A1* | 8/2009 | Bartik et al. | 714/47 |
| 2009/0248381 A1* | 10/2009 | Liu et al. | 703/13 |
| 2010/0107158 A1* | 4/2010 | Chen et al. | 718/1 |
| 2010/0319004 A1* | 12/2010 | Hudson et al. | 719/313 |
| 2011/0061050 A1* | 3/2011 | Sahita et al. | 718/1 |
| 2011/0185153 A1* | 7/2011 | Henry et al. | 712/30 |
| 2011/0202483 A1* | 8/2011 | Bergman et al. | 706/11 |
| 2011/0320892 A1* | 12/2011 | Check et al. | 714/723 |

FOREIGN PATENT DOCUMENTS

| | | | |
|---|---|---|---|
| JP | 08-063368 A | 3/1996 |
| JP | 08-147191 A | 6/1996 |
| JP | 08-314817 A | 11/1996 |
| JP | 10-111815 A | 4/1998 |
| JP | 2009-037574 A | 2/2009 |
| WO | 2012/009105 A2 | 1/2012 |

OTHER PUBLICATIONS

Preliminary Report on Patentability received for PCT application No. PCT/US2011/041086, mailed on Jan. 10, 2013, 7 pages.

Office Action received for Japanese Patent Application No. 2013-513420, mailed on Nov. 26, 2013, 2 pages of Office Action and 2 pages of English Translation.

Office Action received for Korean Patent Application No. 10-2012-7030614, mailed on Apr. 29, 2014, 5 pages of Korean Office Action and 5 pages of English Translation.

Notice of Allowance received for Japanese Patent Application No. 2013-513420, mailed on Mar. 25, 2014, 1 page of Notice of Allowance only.

* cited by examiner

US 8,924,788 B2

REPLAYING ARCHITECTURAL EXECUTION WITH A PROBELESS TRACE CAPTURE

BACKGROUND

1. Technical Field

Embodiments generally relate to the evaluation of software failures. More particularly, embodiments relate to the replaying of captured architecture data to evaluate software failures.

2. Discussion

Current techniques of debugging software may involve executing test content on the platform in question and manually pruning the test content in order to isolate the source of the failure. Such an approach could require multiple iterations before the issue is resolved. In addition, pruning the test content may only be feasible when the source of the content is available. Other techniques of debugging software might involve the use of a logic analyzer to take traces of the executed software logic, wherein a full scale analysis of the trace data is conducted. Trends toward multi-core and/or multi-threaded processors, however, could lead to an increase in the number of probe channels as well as an increase in the cost and complexity of logic analyzers. Simply put, conventional approaches to debugging software may be time-consuming and expensive.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a method in which architecture data for software executing on a system is captured. The architecture data may be replayed in a simulator, wherein failure information corresponding to the software can be obtained from the simulator.

Other embodiments may include a computer readable storage medium having a set of stored instructions which, if executed by a processor, cause a computer to capture architecture data for software executed on a system and replay the architecture data in a simulator. The instructions may also cause a computer to obtain failure information from the simulator, wherein the failure information is to correspond to the software.

In addition, embodiments can provide for a method in which firmware of a system is used to periodically capture, in response to a plurality of interrupts, architecture data for software executing on the system. The architecture data might include state data and event data. A format of the architecture data may be converted into a format associated with a simulator, wherein the architecture data can be replayed in the simulator. The method may also provide for obtaining failure information from the simulator, wherein the failure information corresponds to the software.

Figure 1:
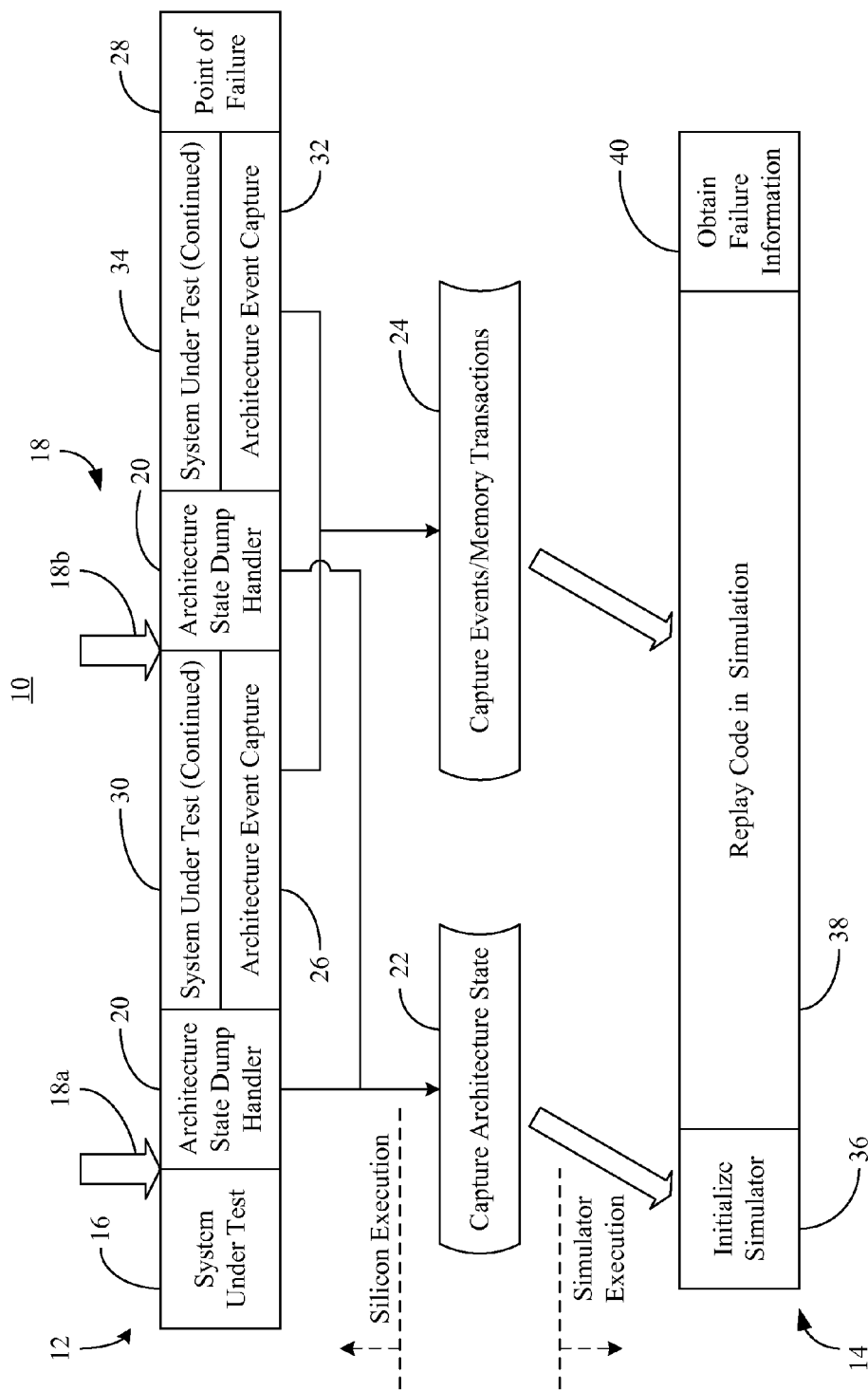
FIG. 1 is a block diagram of an example of a scheme of evaluating software according to an embodiment.

Turning now to FIG. 1, a scheme 10 of evaluating software that is executed on a system is shown. The scheme 10 might be used to support, manage and/or enhance a wide variety of operations such as debugging, validation, and optimization of the evaluated software. In addition, the system on which the software executes could include a mobile platform such as a laptop, personal digital assistant (PDA), mobile Internet device (MID), wireless smart phone, media player, imaging device, etc., or any combination thereof. The system may also be part of a fixed platform such as a personal computer (PC), server, workstation, etc.

Generally, the illustrated scheme 10 includes a silicon execution sequence 12 and a simulator execution sequence 14. The silicon execution sequence 12 may be associated with the execution of the software by an integrated circuit such as one or more cores of a general purpose processor, fixed functionality hardware (e.g., embedded microprocessor), etc., wherein the integrated circuit might be fabricated using circuit technology such as application specific integrated circuit (ASIC), complementary metal oxide semiconductor (CMOS) or transistor-transistor logic (TTL) technology, or any combination thereof. In one example, the software has a many interactions and dependencies due to a complex execution environment such as a multi-threaded or multi-core environment.

In the illustrated example, the system is placed under test by beginning execution of the software on the system at execution processing block 16. Arrow instances 18 (18a-18b) represent the issuance of interrupts on a periodic or other basis, wherein the interrupts can initiate the capture of architecture state data 22 by a dump handler 20. The captured architecture state data 22 could include data relating to various aspects of the system architecture such as instruction fetch units, instruction decoders, caches, execution units, registers, etc. As the execution of the software continues at subsequent execution processing blocks 30 and 34, architecture event data 24 can also be captured via event capture processing blocks 26 and 32, respectively. The architecture event data may include memory transaction (e.g., load-store) data and other data. The illustrated sequence 12 continues until a point of failure is encountered at block 28.

Figure 2:
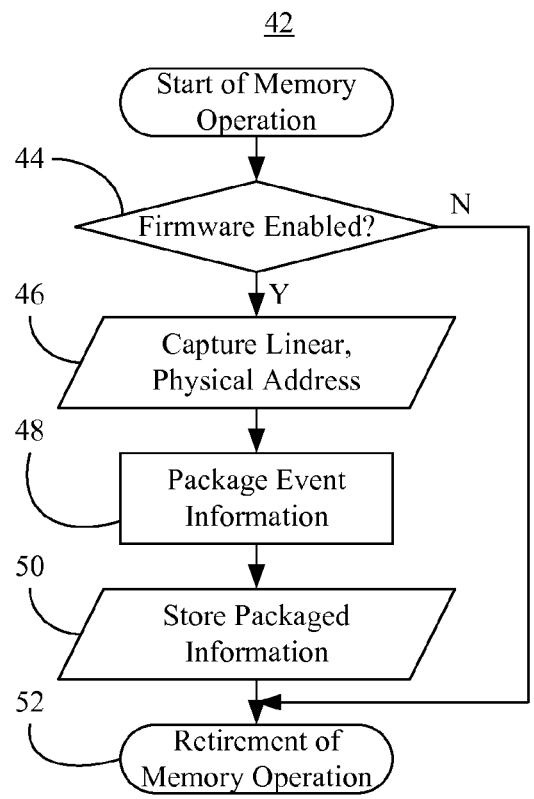
FIG. 2 is a flowchart of an example of a method of capturing memory transactions according to an embodiment.

FIG. 2 shows a method 42 of capturing memory transaction data. The method 42 may be implemented in executable software as a set of logic instructions stored in a machine or computer readable medium of a memory such as random access memory (RAM), read only memory (ROM), programmable ROM (PROM), flash memory, etc., in fixed-functionality hardware using circuit technology such as ASIC, CMOS or TTL technology, or any combination thereof. For example, computer program code to carry out operations shown in the method 42 may be written in any combination of one or more programming languages, including an object oriented programming language such as Java, Smalltalk, C++ or the like and conventional procedural programming languages, such as the "C" programming language or similar programming languages. On the other hand, fixed-functionality hardware or lower-level firmware instructions such as assembly language programming or machine code might be used to carry out operations shown in the method 42. Indeed, the above-described architecture state dump hander 20 operations, architecture event capture blocks 26, 32, and interrupt arrow instances 18 (FIG. 1), may all be automated in firmware (e.g., custom microcode) of the system under test. Accordingly, the illustrated approach does not require manual debugging or the use of complex logic analyzers (e.g., provides a "probeless" test arrangement without external instrumentation) to obtain failure information for the software under test.

Illustrated processing block 44 provides for determining whether the memory transaction data capturing firmware is enabled. If so, one or more addresses accessed by operations of the test software may be identified and captured at block 46. The capture can encompass physical as well as linear addresses involved in each memory access. Other execution data such as the instruction in the execution flow that attempted each memory access and the results of each memory operation in the case of load operations (e.g., changes to flags, registers, etc.), may also be collected. Block 48 provides for packaging the captured addresses and execution data and block 50 provides for storing the packaged information for subsequent conversion and/or transmission to a simulator, as discussed below. In addition, the memory operation can be retired at block 52 without causing any change to the macro- or micro-operation flow of the software under test.

Returning now to FIG. 1, the captured architecture state data 22 and event data 24 can be converted into a format associated with a simulator, wherein simulator processing block 36 provides for initializing the simulator with the captured architecture state data 22. Examples of architectural simulators include, but are not limited to, the MIMIC® simulator available from Gambit Communications, of Nashua, N.H., the Bochs open source emulator (e.g., Bochs IA-32 Emulator, v2.4.5, Apr. 25, 2010, Geeknet, Inc.), and the QEMU open source emulator (e.g., QEMU v0.12.4, May 4, 2010). Processing block 38 provides for using the captured event data 24 to replay the software in the simulator, wherein failure information for the software under test can be obtained from the simulator at block 40. The failure information could be used to conduct additional operations such as debug operations, validation operations and optimization operations.

For example, in a system debug usage model, architectural replay could enable rapid triage of issues classified as software failures. One by-product might be the isolation of issues in need of a more detailed debug. Also, failure issues manifesting from environmental and BIOS (basic input/output system) related causes can be identified using the illustrated approach.

In the case of validation, failure information could have an impact on interoperability and/or compatibility, particularly while operating in multi-core/multi-threaded environments. Issues that may surface include, but are not limited to, synchronization issues across cores/threads, inter-processor load/store issues, ordering of inter-processor interrupts, and so on. Accordingly, architectural replay can facilitate rapid root-cause analysis of the underlying failures.

Moreover, the illustrated approach may be incorporated into software development kits which, when tied with other tools such as compilers and threading tools, can be used by equipment manufacturers and software vendors to enable and optimize the software tool chain.

Figure 3:
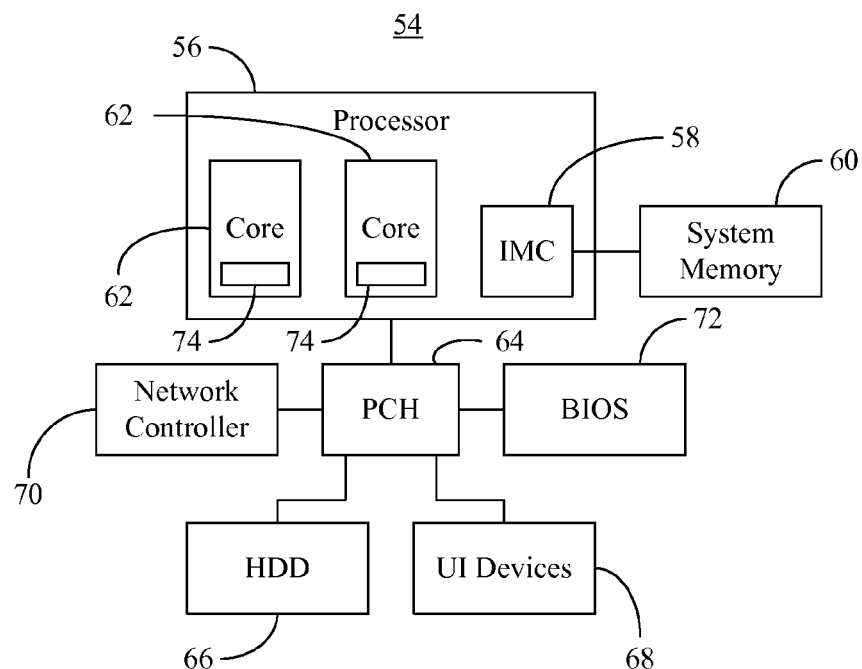
FIG. 3 is a block diagram of an example of a system according to an embodiment.

FIG. 3 shows a computing system 54, wherein the system 54 may be part of a mobile platform such as a laptop, PDA, MID, wireless smart phone, media player, imaging device, etc., or any combination thereof. The system 54 may also be part of a fixed platform such as a PC, server, workstation, etc. The illustrated system 10 includes a host processor 56 that might include an integrated memory controller 58 that provides access to system memory 60, which could include double data rate (DDR) synchronous dynamic random access memory (SDRAM, e.g., DDR3 SDRAM JEDEC Standard JESD79-3C, April 2008) modules. The modules of the system memory 60 may be incorporated into a single inline memory module (SIMM), dual inline memory module (DIMM), small outline DIMM (SODIMM), and so on. The processor 56 may also have one or more processor cores 62, where each core 62 may be fully functional with instruction fetch units, instruction decoders, level one (L1) cache, execution units, and so on. In one example, the internal cache(s) of the processor 56 could be implemented in static RAM (SRAM). The processor 56 may also execute an operating system (OS) such as a Microsoft Windows, Linux, or Mac (Macintosh) OS, and various other software applications, wherein such software might experience one or more points of failure.

The illustrated processor 56 communicates with a platform controller hub (PCH) 64, also known as a Southbridge in certain systems. The PCH 64 may have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The PCH 64 can communicate with a network controller 70, which could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The illustrated PCH 64 is also coupled to one or more mass storage devices, which may include a hard disk drive (HDD) 66, ROM, optical disk, flash memory, etc. In addition, the PCH 64 could provide support for user interface (UI) devices 68 such as a microphone, display, keypad, mouse, speakers, etc., in order to allow a user to interact with and perceive information from the system 54.

The cores 62 may execute a set of probeless logic instructions (e.g., microcode/firmware) 74, which might be initially loaded from BIOS 72 (e.g., from PROM, NAND-based solid state disk (SSD), or flash memory as a patch), dynamically loaded via a tool, or already resident in the UROM (microROM, not shown) of the processor 56. In the illustrated example, execution of the set of probeless logic instructions 74 causes the system 54 to capture architecture data for the software (e.g., OS and other application program code) executed on the system 54 without impacting the execution of the software under test. In addition the logic instructions 74 may replay the captured architecture data in a simulator, and obtain failure information from the simulator, wherein the failure information corresponds to the software executed on the system 54. As already noted, the architecture data could include state data and event data, wherein in one example, the event data includes memory transaction data.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
periodically capturing by firmware of a system, in response to issuance of a plurality of interrupts by the firmware, architecture data for software executing on the system, wherein the architecture data includes state data corresponding to a state of a component of the system and event data including execution data, the execution data including memory transaction data having a result corresponding to a memory operation;
converting a format of the architecture data into a format associated with a simulator;
replaying the architecture data in the simulator; and
obtaining failure information from the simulator, wherein the failure information corresponds to the software.

2. The method of claim 1, further including:
identifying one or more captured addresses accessed by an operation of the software; and
packaging the one or more captured addresses with the execution data corresponding to the software to transmit to the simulator.

3. The method of claim 1, further including conducting at least one of a debug operation, a validation operation and an optimization operation based on the failure information.

4. The method of claim 1, wherein the architecture data is captured for software executing on a system including at least one of a multi-core processor and a multi-threaded processor.

5. A non-transitory computer readable storage medium comprising a set of instructions which, if executed by a processor, cause a computer to:
capture architecture data for software executed on a system by firmware of the system, wherein the architecture data includes state data corresponding to a state of a component of the system and event data including execution data, the execution data including memory transaction data having a result corresponding to a memory operation;
replay the architecture data in a simulator; and
obtain failure information from the simulator, wherein the failure information is to correspond to the software,
wherein the instructions, if executed, further cause a computer to periodically capture the architecture data in response to issuance of a plurality of interrupts by the firmware of the system.

6. The non-transitory medium of claim 5, wherein the instructions, if executed, further cause the computer to:
identify one or more captured addresses accessed by an operation of the software; and
package the one or more captured addresses with the execution data corresponding to the software to be transmitted to the simulator, wherein the one or more addresses are to include at least one of a linear address and a physical address.

7. The non-transitory medium of claim 5, wherein the instructions, if executed, further cause a computer to conduct at least one of a debug operation, a validation operation and an optimization operation based on the failure information.

8. The non-transitory medium of claim 5, wherein the instructions, if executed, further cause a computer to convert a format of the architecture data to a format associated with the simulator.

9. The non-transitory medium of claim 5, wherein the system is to include at least one of a multi-core processor and a multi-threaded processor.

10. A method comprising:
capturing architecture data for software executing on a system by firmware of the system in response to issuance of a plurality of interrupts by the firmware of the system, wherein the architecture data includes state data corresponding to a state of a component of the system and event data including execution data, the execution data including memory transaction data having a result corresponding to a memory operation;
replaying the architecture data in a simulator; and
obtaining failure information from the simulator, wherein the failure information corresponds to the software.

11. The method of claim 10, further including:
identifying one or more captured addresses accessed by an operation of the software; and
packaging the one or more captured addresses with the execution data corresponding to the software to transmit to the simulator, wherein the one or more addresses include at least one of a linear address and a physical address.

12. The method of claim 10, further including conducting at least one of a debug operation, a validation operation and an optimization operation based on the failure information.

13. The method of claim 10, further including converting a format of the architecture data to a format associated with the simulator.

14. The method of claim 10, wherein the architecture data is captured for software executing on a system including at least one of a multi-core processor and a multi-threaded processor.

15. The method of claim 2, further including determining whether the firmware includes enabled memory transaction data capturing firmware, wherein the memory operation is retired without capturing the memory transaction data when the memory transaction data capturing firmware is disabled.

16. The method of claim 15, further including identifying one or more of a memory load operation, a memory store operation, and an instruction in an execution flow for an attempted memory access when the firmware includes the enabled memory transaction data capturing firmware.

17. The method of claim 16, wherein the result includes a change to a register corresponding to the memory load operation and an outcome corresponding to the attempted memory access.

18. The method of claim 1, wherein the component includes one or more of an instruction fetch unit, an instruction decoder, a cache, an execution unit, and a register.

* * * * *